E. H. PIERSEN.
ELECTRIC SWITCH.
APPLICATION FILED AUG. 2, 1915.
1,339,976.
Patented May 11, 1920.
2 SHEETS—SHEET 2.
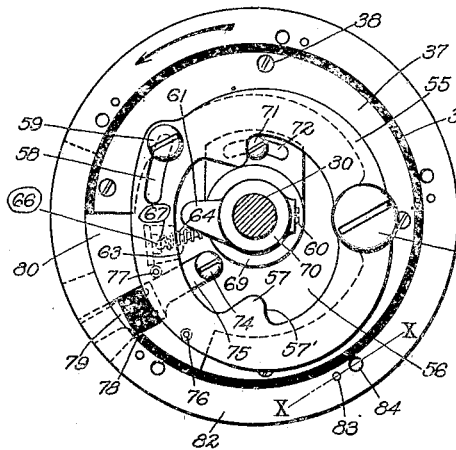
Fig. III.
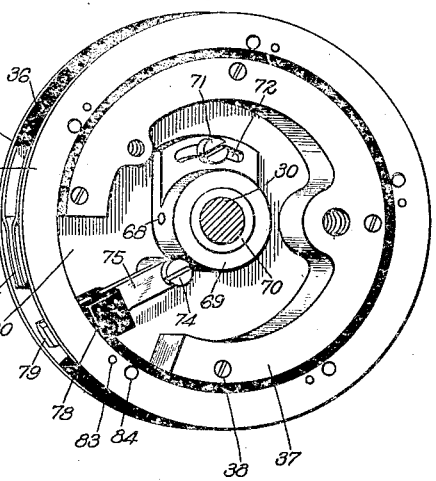
Fig. V.
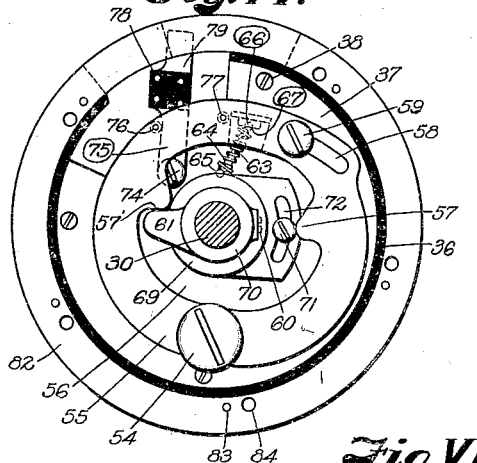
Fig. IV.
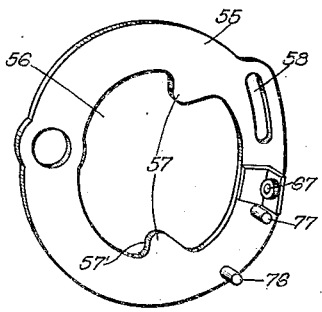
Fig. VI.
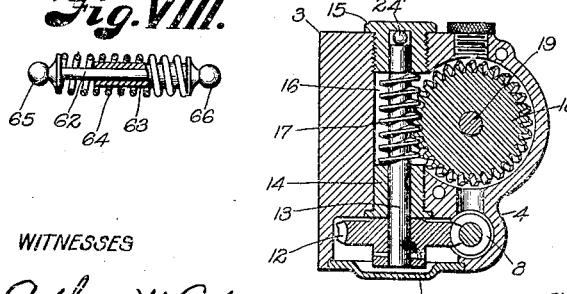
Fig. VIII. Fig. VII.
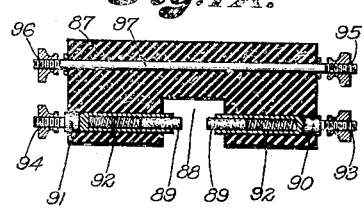
Fig. IX.
WITNESSES
Arthur W. Capp.
Milton Lenoir
INVENTOR.
Edwin H. Piersen
BY
ATTORNEY.

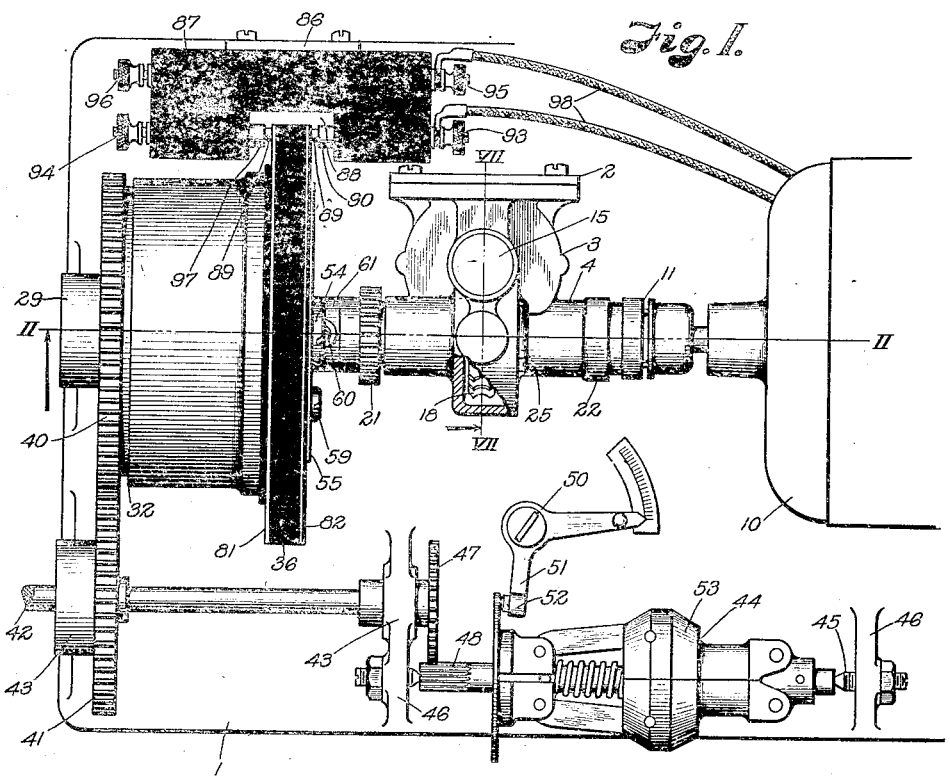

UNITED STATES PATENT OFFICE.

EDWIN H. PIERSEN, OF TOPEKA, KANSAS.

ELECTRIC SWITCH.

1,339,976.   Specification of Letters Patent.   Patented May 11, 1920.

Application filed August 2, 1915. Serial No. 43,119.

*To all whom it may concern:*

Be it known that I, EDWIN H. PIERSEN, a citizen of the United States, residing at Topeka, in the county of Shawnee and State of Kansas, have invented certain new and useful Improvements in Electric Switches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to electric switches, more particularly to a switch for spring motors, and has particular reference to means for keeping the springs wound to within the limits of a predetermined tension so as to eliminate the necessity of manual attention and enable a machine to be actuated at a constant speed and under a substantially constant tension, irrespective of fluctuations in speed or power of the prime mover.

The principal object of the invention is to provide an electric switch operable from either a spring motor or an electric motor to control the supply of current to the electric motor and keep the spring motor within the limits of a predetermined tension.

A further object of the invention is to provide a switch which will not arc or burn the contacts, no matter how fast, slow or intermittent the motion of the spring motor is, nor how irregular the action of the electric motor.

In accomplishing these objects, I have provided the improved details of structure hereinafter described and illustrated in the accompanying drawings, wherein:—

Figure I is a plan view of a device constructed in accordance with my invention.

Fig. II is a longitudinal vertical section on the line II—II, Fig. I.

Fig. III is a face view of the switch.

Fig. IV is a similar view showing the parts in position for preventing the spring motor from unwinding below a certain predetermined limit when the current to the electric motor is cut off.

Fig. V is a perspective view of the switch with the operating cam removed for better illustration.

Fig. VI is a perspective of the reverse side of the operating cam.

Fig. VII is a vertical sectional view of the speed reducing device taken on the line VII—VII, Fig. I.

Fig. VIII is an elevation, partly in section, of a booster for throwing the operating cam.

Fig. IX is a longitudinal sectional view of the brush holder.

Fig. X is a sectional view of part of the insulated collector rings on the line X—X, Fig. III, particularly illustrating the attachment of the parts.

Referring more in detail to the parts:—

1 designates a base which may be of any suitable construction, and rising from the base is a bracket 2 on which is secured a speed reducing device 3, comprising a housing 4 having a horizontal bore 5 provided with bushings 6 and 7 in which is revolubly mounted a worm 8, the shaft 9 of which extends beyond the housing and is operatively connected with an electric motor 10 by a coupling 11.

The worm 8 meshes with a worm gear 12 that is rigidly mounted on the shaft 13, which is revolubly mounted in bushing 14 and 15 in a bore 16 in the housing 3, and which has a worm 17 that meshes with a worm gear 18 that is rigidly mounted on the shaft 19 that is journaled in the bushing 20 in the housing and provided with a spur gear wheel 21 for the purpose presently described.

As the worm of a worm and gear driving set always has considerable end thrust, I provide the bushing 6 with a cupped head 22 for receiving a ball thrust bearing 23 that engages the coupling 11 to hold the worm 8 in position, and provide the bushing 15 with external threads that engage corresponding threads in the housing, so that a ball 24' may be inserted between the head of the bushing and the shaft 13 to take up the end thrust of the worm 17.

The housing is also provided with covers 25 opposite the worm gears 12 and 18 and with apertures 26 and 27 through which lubricant may be inserted and circulated to all parts of the device.

Revolubly mounted in a bushing 28 in one end of the bore 5 of the housing 3 and in a bearing standard 29 on the frame 1 is a shaft 30, which carries a gear wheel 31, that meshes with the gear wheel 21 on the shaft 19, and a spring drum 32 which has driving connection with the shaft through a volute spring 33 that connects with a pin 34 in the shaft and a stud 35 in the drum.

The drum 32 is closed at one end and adjacent the open end thereof is an insulation ring 36, which is held in position by a cover plate 37 that incloses the drum and is held thereto by screws 38 which pass through the insulating ring and hold the parts firmly together.

Fixed to the opposite side of the drum 32 is a gear wheel 40, which meshes with a gear wheel 41 on the power shaft 42, the said shaft being revolubly mounted in bearings 43 on the base frame 1 and adapted to furnish power to a machine, or the like (not shown).

In order to regulate the speed of the shaft 42, I provide a governor 44, which is revolubly mounted in point bearings 45 in the standards 46 on the frame 1, and which is driven from a gear wheel 47 on the power shaft 42 that meshes with a pinion 48 on the governor, so that the governor is revolved when the power shaft is in operation.

Operating in conjunction with the governor is a regulator 50, which may be of any suitable construction, but is here shown as an arm 51 that is pivotally mounted on the frame 1 and has a brake shoe 52, which may be moved to or from the governor to determine the spread of the governor weights 53 and consequently the speed of the governor and power shaft.

Pivotally mounted on a stud 54 on the cover plate 37 is a cam 55, constituting a switch shifting element as will presently be described, which comprises a sheet metal plate having a central aperture 56 provided with inwardly directed, oppositely disposed points 57, and having an arcuatile slot 58 for receiving the stud 59 on the cover plate to limit the travel of the cam in each direction.

Fixed to the shaft 30, by a set screw 60, is a lever 61, which is adapted to revolve with the shaft within the aperture 56 of the cam 55 and to engage the points 57 and move the cam to each limit of its travel.

In order to accelerate the action of the cam after it passes its meridian and hold it to the limits of its travel, I provide a booster comprising telescoping members 62 and 63, which are held yieldingly apart by a coil spring 64 and which are provided with ball-shaped ends 65 and 66 that seat in a socket 67 on the cam 55 and in a socket 68 on the collar 69 respectively, the said collar being adjustably mounted on a hub 70 of the cover plate 37 and held in adjusted position by a clamping screw 71, which passes through a slot 72 in an extended portion of the collar 69 and threads into the cover plate.

Pivotally mounted on a stud 74 on the cover plate is an arm 75, which is adapted for engagement by pins 76 and 77 on the cam 55, and which has an insulation head 78 in which is fixed a metal knife 79 that projects through an opening 80 formed by cutting away a portion of the cover plate and insulation ring 36, so that the knife lies between the collector rings 81 and 82 that are fixed to opposite faces of the insulation ring by rivets 83 in such a manner that the rings are insulated from each other and from other parts of the device.

The preferred method of securing the rings in place is shown in Fig. X and consists in nesting the heads of the rivets 83 within apertures 84 in the insulation ring 36 so that the rivets for each collector ring pass only half-way through the insulation ring.

Fixed to the inner faces of the collector rings are spring fingers 85 which extend into the opening 80 and are adapted to receive the knife 79, at times, and close a circuit between the two rings.

Rigidly mounted on a bracket 86 on the base 1 is a block of insulation material 87, having a cut-out portion 88 for receiving the collector rings 81 and 82 and projecting into said cut-out portion are brushes 89, which contact with the collector rings, and which are supported in tubular members 90—91 in the block and yieldingly urged toward the rings by springs 92.

The tubular members are provided with binding posts 93 and 94 respectively and adjacent said posts are similar posts 95 and 96, which are connected by a rod 97; the posts 93 and 95 being connected by wires 98 to the motor 10 and the posts 94 and 96 to the ordinary lighting circuit (not shown), so that the electric motor is energized whenever a circuit is closed in the switch.

When the device is to be operated, presuming the parts to be constructed and assembled as described, the electric switch is thrown out, as shown in Fig. III, and the governor locked.

The control arm 50 is first opened to permit the governor and power shaft 42 to revolve under the influence of the spring motor, which revolves in the direction of the arrow Fig. III.

The effect of this movement is to move one of the cam points 57 against the arm 61, so that the cam is shifted on its mounting 54 and urged to the opposite limit of its travel by the booster.

During the first part of the cam movement, the pin 76 approaches but does not move the arm 75, but as soon as the booster throws the cam past center, the pin 76 engages the arm and moves the knife 79 quickly between the spring fingers 85 and closes a circuit through the motor.

The motor, driving through the speed reducing device 3, turns the arm 61 in the same direction as the spring drum is turning, only at a higher rate of speed, so that the arm moves around and contacts with the other of the cam points 57 and moves the cam to the opposite limit of travel.

This action is identical with the throwing in movement just described, in that in this case the pin 77 moves toward the arm 75 until the cam passes its meridian and then contacts with the arm to move it quickly from between the fingers 85 and prevent arcing or burning the contacts.

It has been found that a satisfactory operation may be secured when the spring motor is rewound after each half revolution. This is effected with a structure like that shown in the drawings for the reason that while the space between the points 57 is considerably less than 180 degrees, an additional movement of the drum is required while the arm 61 moves along the inclined face of the point 57 to rock the cam and shift the booster which, taken with the idle movement of the cam represents substantially a half revolution of the drum. It is apparent that the moment of contact may be varied by variation of the inclination of the booster relative to the shaft 30, as with the booster substantially perpendicular to the shaft it is moved over its center under a very short push from its pin 76 or 77, while a greater incline requires a longer push from the pin to carry it over its center, with a resultant delay in shift of the contacts and rewind of the spring motor. In other words, if the moment of throw in the switch arm is advanced its moment of throw-out is retarded, thereby maintaining constant limits of travel of the spring motor but providing for variations of the distance of throw under influence of the booster and adjustability for different currents with their different arc limits.

If an operator should neglect to connect the terminals 94 and 96 with the service line and should open the speed control, it is evident that the power shaft would revolve and the switch be thrown in, but that the spring motor would soon run down.

In order to prevent this occurrence, the cam 55 is constructed to prevent the spring motor running below a certain point, and is illustrated in Fig. IV, wherein the cam is shown in shifted position and the switch closed, but as there was no current at the terminals 94—96 the electric motor did not start, and the spring motor unwound until the straight face 57' of one of the cam points 57 came to rest against the lever 61 and stopped the spring motor.

It is apparent that as soon as the current is supplied, the switch, being closed, will immediately start the electric motor, wind the spring motor and move the arm 61 around past the opposite cam point 57 and engage the first one again to throw out the switch.

If it is desired to increase or decrease the tension of the volute spring 33, the cam 55 may be shifted manually to add another turn thereto or vice versa, or if a whole turn should be too great the arm 61 may be turned in either direction on the shaft 30 by loosening the set screw 60 and seating it in another of the depressions 60' in the shaft.

Having thus described my invention, what I claim as new therein and desire to secure by Letters-Patent, is:—

1. An electric switch comprising elements having independent movement in the same direction, a contact point on one element, a switch member movable in the plane of movement of and coöperative with the contact point, and means operable by the other element to alternately accelerate and retard travel of the switch member relative to the contact point.

2. A spring motor, a prime mover, and automatically operable means for rendering the prime mover effective for winding the motor spring only after the spring has dissipated all the energy stored therein by the previous winding movement of the prime mover.

3. A spring motor, a prime mover, automatically operable means for rendering the prime mover effective for winding the motor spring, said means being provided with an operating element having a relatively fixed amplitude of movement through an oscillatory retraceable arc, and means for actuating said element at the limit of either the winding or unwinding movement of the spring motor.

4. A spring motor, a prime mover, automatically operable means for rendering the prime mover effective for winding the motor spring, said means being provided with an operating element having a relatively fixed amplitude of movement of changeable position through an oscillatory retraceable path, and means for actuating said element at the limit of either the winding or unwinding movement of the spring motor.

5. A spring motor, a prime mover, automatically operable means for rendering the prime mover effective for winding the spring motor, said means including a circuit making and breaking contact having a relatively fixed amplitude of movement through an oscillatory retraceable path, and means for actuating said circuit making and breaking contact at the limit of either the winding or unwinding movement of the spring motor.

6. A spring motor adapted to store energy, an electric motor, automatically operable means for rendering the electric motor effective for winding the spring motor, said means comprising a circuit making and breaking contact to close and open the circuit to the electric motor, said contact having an amplitude of movement through an oscillatory retraceable path, and means for actuating said circuit making and breaking contact at the limit of either the winding or unwinding movement of the spring motor.

7. A spring motor, a prime mover, automatically operable means for rendering the prime mover effective for winding the motor spring at one limit of a winding and unwinding arc of said spring, said means being manually operable to effect variations in turns of the spring.

8. A spring motor, a prime mover, means interposed between the spring motor and prime mover for intermittently effecting transmission of power from one to the other, a device controlling said means automatically operable at opposite limits of a winding and unwinding arc of the motor spring and manually operable to effect variation in turns of the spring .

9. A spring motor, a prime mover, an electric switch operating mechanism interposed between the spring motor and prime mover for rendering the prime mover effective at opposite limits of a winding and unwinding arc of the motor spring and manually operable to effect variation in turns of the spring.

10. A spring motor, an electric motor, a circuit including the electric motor and a contact on the spring motor, a switch on the spring motor coöperative with said contact to open and close the circuit, means operable by the electric motor to wind the spring motor when the circuit is closed and a shifter automatically operable to reverse the switch at opposite limits of a winding and unwinding arc of the motor spring and manually operable to effect variations in turns of the spring.

11. A spring motor, an electric motor, a circuit including the electric motor and a contact on the spring motor, a switch on the spring motor coöperative with said contact to open and close the circuit, means operable by the electric motor to wind the spring motor when the circuit is closed, a switch shifting device movable with the spring motor, and means connected with the electric motor and operating the shifter at opposite limits of a winding and unwinding arc of the motor spring, the said shifter being manually operable to effect variation in turns of the spring.

12. In combination with an electric motor, and a spring motor, a circuit including the electric motor, a contact and a switch, the contact and switch both movable with one of the motors, an actuator movable with the other motor, a member alternately engageable by and with the actuator to shift the switch, and means operable on the switch following an initial movement thereof by the actuator in either direction to snap the switch open or closed.

13. In combination with an electric motor and a spring motor, a circuit including the electric motor, a contact and a switch, the contact and switch both movable with the spring motor, a switch shifter movable with the spring motor, an actuator movable with the electric motor, engageable with the shifter to start the switch toward open position while the electric motor is active and engageable by the shifter to start the switch toward closed position while the electric motor is inactive, and a booster completing movement of the switch in either direction to snap the switch to and from closed positions.

14. In combination with an electric motor and a spring motor, a contact point and a switch movable with the spring motor and connected with the electric motor, a switch shifter movable with the spring motor, the switch and shifter also having movement independent of movement of the spring motor, a booster movable with the spring motor and operable on the shifter to effect final snap movement of the switch both to and from engagement with said contact point, and an actuator movable with the electric motor and engageable alternately by and with the shifter at opposite limits of a winding and unwinding arc of movement of the spring to feed the same to the booster.

15. In combination with an electric motor and a spring motor, a contact point and a switch movable with the spring motor and connected with the electric motor, a switch shifter movable with the spring motor, the switch and shifter also having movement independent of movement of the spring motor, a booster movable with the spring motor and operable on the shifter to effect final snap movement of the switch both to and from engagement with said contact point, and an actuator movable with the electric motor and engageable alternately by and with the shifter at opposite limits of a winding and unwinding arc of movement of the spring to feed the same to the booster, the actuator being adjustable to vary strength of the spring by position of the arc while retaining length of the arc constant.

16. In combination with an electric motor and a spring motor, a contact point and a switch movable with the spring motor and connected with the electric motor, a switch shifter movable with the spring motor, the switch and shifter also having movement independent of movement of the spring motor, a booster movable with the spring motor and operable on the shifter to effect final snap movement of the switch both to and from engagement with said contact point, and an actuator movable with the electric motor and engageable alternately by and with the shifter at opposite limits of a winding and unwinding arc of movement of the spring to feed the same to the booster, the shifter being manually operable to effect variation in turns of the spring.

17. In combination with an electric motor and a spring motor, operable at different speeds, a contact point and a switch movable with the spring motor, a switch shifter movable with the spring motor, the switch and shifter also having movement independently of each other and of the spring motor, a booster movable with the spring motor and operable on the shifter to snap the switch onto and off of the contact following starting movements of the shifter, and an actuator movable with the electric motor engageable alternately by and with the shifter to feed the switch to the booster at opposite limits of a winding and unwinding arc less than a complete turn of the spring, the actuator being adjustable to vary strength of the spring by position of the arc while retaining its length constant and the shifter being manually operable to free the actuator and effect variation in turns of the spring.

18. In an electric switch, spaced brushes, a movable body comprising insulated members having constant contact with said brushes, a knife movable relative to said insulated members to close and open a circuit, an oscillatory cam movable with said body, means on the cam for engaging and shifting the knife, a second body movable in the same direction as the first body but at a different speed, and means on the second body engageable by the cam to shift the knife in one direction and with the cam to shift the knife in the opposite direction.

19. In an electric switch, spaced brushes, a body rotatable between the brushes comprising rings adapted for contact with the brushes and an intervening ring of insulation material having a cut-out space, spring fingers in the cut-out space having conductive relation to respective contact rings, an arm movably mounted on the body, having a knife portion projected into said cut-out space and adapted for insertion between said spring fingers, an oscillatory cam on said body, means on the cam engageable with opposite edges of the arm, a second body movable independently of the first, and means on the second body engageable by the cam to shift the cam and effect movement of the knife to circuit closing relation with the spring finger and engageable with the cam to shift the cam in the other direction and open the circuit.

20. In an electric switch a rotatable shaft, a body rotatable on the shaft and comprising a mounting body and a contact point insulated from the body, a ring cam pivotally mounted on said body, inclosing said shaft and having spaced, in-turned points and spaced shift pins, a switch arm pivotally mounted on said body and projected between said shift pins to engage said contact point, and an arm fixed on said shaft and normally located between the inturned cam points.

21. In an electric switch a rotatable shaft, a body rotatable on the shaft and comprising a mounting body and a contact point insulated from the body, a ring cam pivotally mounted on said body, inclosing said shaft and having spaced, in-turned points and spaced shift pins, a switch arm pivotally mounted on said body and projected between said shift pins to engage said contact point, and an arm adjustably fixed on said shaft and normally located between the inturned cam points.

22. In an electric switch, a rotatable shaft having a radial arm, a body rotatable on the shaft, having an insulated contact point, a contact member on the body engageable with said point, an oscillatory ring cam on said body engageable with said contact member to shift the same in either direction according to direction of movement of the cam and having spaced, inwardly directed cam points normally located at opposite sides of the shaft arm and having wiping faces engageable thereby to shift the cam, one of the points having a hook opposite its wiping face engageable with the arm upon continued movement of the rotatable body to stop the body.

23. In an electric switch, the combination of a movable element comprising a contact member, a switch arm having primary movement with said element, a shifter also having primary movement with said element and comprising means for alternately engaging opposite edges of the switch arm to effect secondary movement of said arm and spaced to permit independent initial movement of the shifter, an independently movable element coöperative with said shifter to effect secondary movement of the switch arm according to advance of one of said elements relative to the other, and means for effecting accelerated movement of the switch arm.

24. In an electric switch, the combination of a movable element having a contact, a switch arm having primary movement with said element, a shifter also having primary movement with said element and comprising means for alternately engaging opposite edges of the switch arm to effect secondary movement of said arm and spaced to permit independent initial movement of the shifter, an independently movable element coöperative with said shifter to effect primary movement of the switch arm according to advance of one of said elements relative to the other, and means for effecting accelerated movement of the switch arm at a determined point in the secondary movement of said arm.

25. In combination with a rotatable shaft, a body rotatable on the shaft comprising collector rings and an intervening, recessed, insulation ring, brushes contacting the collector rings, spring fingers connected with the collector rings and extending, in spaced relation, into the recess in the insulation ring, a contact arm on said body having a knife portion movable relative to said fingers, a ring cam pivotally mounted on said body eccentrically of the shaft, means on said cam for engaging the contact arm to shift the same, and having inturned points, an arm on said shaft engageable by an inturned point on the cam to shift the cam in one direction and with an inturned point on the cam to shift the cam in the other direction, a collar loosely mounted on said shaft, means adjustably fixing the collar to said body, a booster comprising telescoping members, one pivotally mounted on said collar and the other pivotally mounted in the cam, and a spring yieldingly urging the telescoping members apart for the purpose set forth.

In testimony whereof I affix my signature in presence of two witnesses.

EDWIN H. PIERSEN.

Witnesses:
  W. H. METZDORF,
  KENNEDY.